(12) United States Patent
Song et al.

(10) Patent No.: US 6,346,344 B1
(45) Date of Patent: Feb. 12, 2002

(54) CIRCUIT BREAKER FOR SECONDARY BATTERY

(75) Inventors: Man-Gon Song, Chungchongnam-do; E-Joo Hwang, Kyonggi-do; Hyoung-Su Kim, Chungchongnam-do, all of (KR)

(73) Assignee: SamSung SDI Co., Ltd., Youngin (KR)

( * ) Notice: Subject to any disclaimer, the term of this patent is extended or adjusted under 35 U.S.C. 154(b) by 0 days.

(21) Appl. No.: 09/323,529

(22) Filed: Jun. 1, 1999

(30) Foreign Application Priority Data

Jul. 28, 1998 (KR) .............................. 98-30289

(51) Int. Cl.[7] .................................. H01M 2/34
(52) U.S. Cl. .................. 429/61; 429/53; 429/7
(58) Field of Search .............. 429/61, 53, 57, 429/7

(56) References Cited

U.S. PATENT DOCUMENTS 5,702,840 A * 12/1997 Byon
5,853,912 A * 12/1998 Naing et al.
6,242,126 B1 * 6/2001 Mori et al. .................. 429/53

* cited by examiner

*Primary Examiner*—John S. Maples
(74) *Attorney, Agent, or Firm*—Robert E. Bushnell, Esq.

(57) ABSTRACT

A battery includes a can filled with an electrolyte and an electrode assembly and a cap assembly mounted on an upper end of the can. The cap assembly includes a plate provided with a safety groove, a cap cover disposed on the plate, and a circuit breaker disposed under the plate. The circuit breaker is designed to have an attaching portion firmly attached to the plate and a mechanically weak portion formed around the attaching portion so that the detachment of the circuit breaker from the plate is done by breaking the mechanically weak portion under a predetermined amount of force. The mechanically weak portion is defined by a notch formed around the attaching portion.

2 Claims, 5 Drawing Sheets

CIRCUIT BREAKER FOR SECONDARY BATTERY

BACKGROUND OF THE INVENTION

1. Field of the Invention

The present invention relates to a secondary battery and, more particularly, to a circuit breaker for a secondary battery, which can shut out current and prevent explosion of the battery when internal pressure of the battery is increased above a permissible level, thereby increasing safety of the battery.

2. Description of the Prior Art

Generally, secondary batteries are compact in size and rechargeable, while providing a large capacity. Well known as secondary batteries are a Nickel metal hydride battery, a Lithium battery, and a Lithium(Li)-ion battery.

Particularly, the Li-ion battery uses lithium metal oxide as a positive active material and carbon or a carbon compounds as a negative active material. Lithium salt dissolved in an organic solvent is used as an electrolyte via which lithium ions move between positive and negative electrodes. Charging and discharging operations are realized while the lithium ions are moved between positive and negative electrodes.

FIG. 6 shows a conventional Li-ion battery.

A rolled electrode assembly 2 is inserted into a can 4 filled with electrolyte, the rolled electrode assembly consisting of positive and negative electrodes and a separator disposed between the positive and negative electrodes. Mounted on an upper end of the can 4 is a cap assembly 8.

The cap assembly 8 is insulated from the can 4 by a gasket 6. That is, the upper end of the can 4 is crimped on an outer periphery of the cap assembly 8 with the gasket 6 interposed therebetween. The cap assembly 8 includes a plate 14 provided with a safety groove, a current control member 12 disposed on the plate 14, and a cap cover 10 disposed on the current control member 12. Attached under the plate 14 is a circuit breaker 18 with an insulator 16 disposed therebetween. A positive tab 20 is welded to the circuit breaker 18 before the circuit breaker 18 is assembled in the cap assembly 8.

In the Li-ion battery, when the battery malfunctions or is overcharged, the electrolyte is dissolved at a positive electrode, while lithium metal is extracted from a negative electrode, causing a short circuit. As a result, internal pressure of the battery is increased above a permissible level. This may cause the battery to explode.

However, to prevent the above hazardous problems, the circuit breaker 18 is designed to be detached from the plate 14 to interrupt current flow when the internal pressure is excessively increased, thereby providing safety to the battery. Here, the detachment force of the circuit breaker 18 from the plate 14 is determined by adhesiveness of the weld between the circuit breaker 18 and the plate 14. Therefore, it is greatly difficult to precisely set the detachment force with respect to the internal pressure of the battery.

That is, if the welding force of the circuit breaker 18 to the plate 14 is set to be too high, since the circuit breaker may not be detached from the plate 14 even under the excessively increased internal pressure, the battery may explode. And if the welding force is too low, the circuit breaker may be detached from the plate 14 even under the permissible internal pressure, deteriorating working efficiency of the battery.

SUMMARY OF THE INVENTION

Therefore, the present invention has been made in an effort to solve the above described problems.

It is an objective of the present invention to provide a circuit breaker for a secondary battery, which can reliably prevent any hazardous problems caused by excessive internal pressure of the battery.

To achieve the above objective, the present invention provides a cap assembly comprising a plate, and a circuit breaker disposed under the plate. As a feature of the present invention, the circuit breaker comprises an attaching portion firmly attached to the plate and a mechanically weak portion formed around the attaching portion.

Attaching force of the attaching portion to the plate is higher than detachment force of the mechanically weak portion.

Preferably, the mechanically weak portion comprises a notch formed around the attaching portion. A depth of the notch is determined such that the notch can be broken by an internal pressure of 7–15 $kgf/cm^2$.

Preferably, the mechanically weak portion of the circuit breaker is thinner than the remainder of the circuit breaker.

More preferably, the circuit breaker is provided with a centrally formed opening and a bridge formed across the opening such that the mechanically weak portion is notches formed on both ends of the bridge and the attaching portion is a portion between the notches.

Alternatively, a circular notch is formed around the attaching portion of the circuit breaker such that the attaching portion can break away from the remainder of the circuit breaker at the circular notch.

In addition, the present invention provides a circuit breaker for secondary batteries including a first portion for attaching to a plate, a second portion formed around the first portion, and a third portion connecting the first portion to the second portion, the third portion being broken under a predetermined level of pressure applied to the plate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
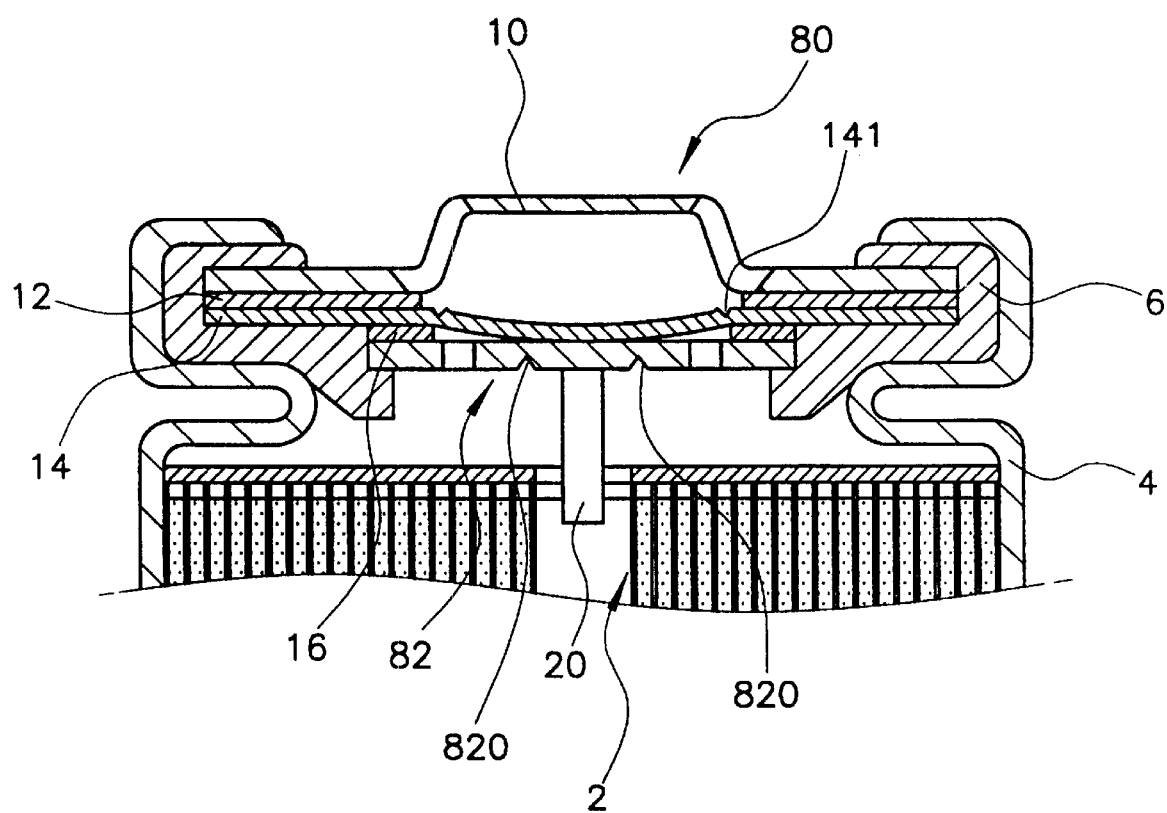
FIG. 1 is a partial sectional view illustrating a secondary battery where a circuit breaker according to a first embodiment of the present invention is employed.

Referring first to FIG. 1, there is shown a secondary battery where a circuit breaker according to a preferred embodiment of the present invention is employed.

A rolled electrode assembly 2 is inserted into a can 4 filled with electrolyte, the rolled electrode assembly 2 consisting of positive and negative electrodes and a separator disposed between the positive and negative electrodes. Mounted on an upper end of the can 4 is a cap assembly 80.

The cap assembly 80 is insulated from the can 4 by a gasket 6. That is, the upper end of the can 4 is crimped on an outer periphery of the cap assembly 80 with the gasket 6 interposed therebetween. The cap assembly 80 includes a plate 14 provided with a safety groove 141, a current control member 12 disposed on the plate 14, and a cap cover 10 disposed on the current control member 12. Attached under the plate 14 is a circuit breaker 82 with an insulator 16 disposed therebetween. Preferably the circuit breaker 82 is firmly attached at a predetermined portion to the plate 14 by welding.

As a feature of the invention, a mechanically weak portion is formed around an attaching portion of the circuit breaker 82.

Figure 2:
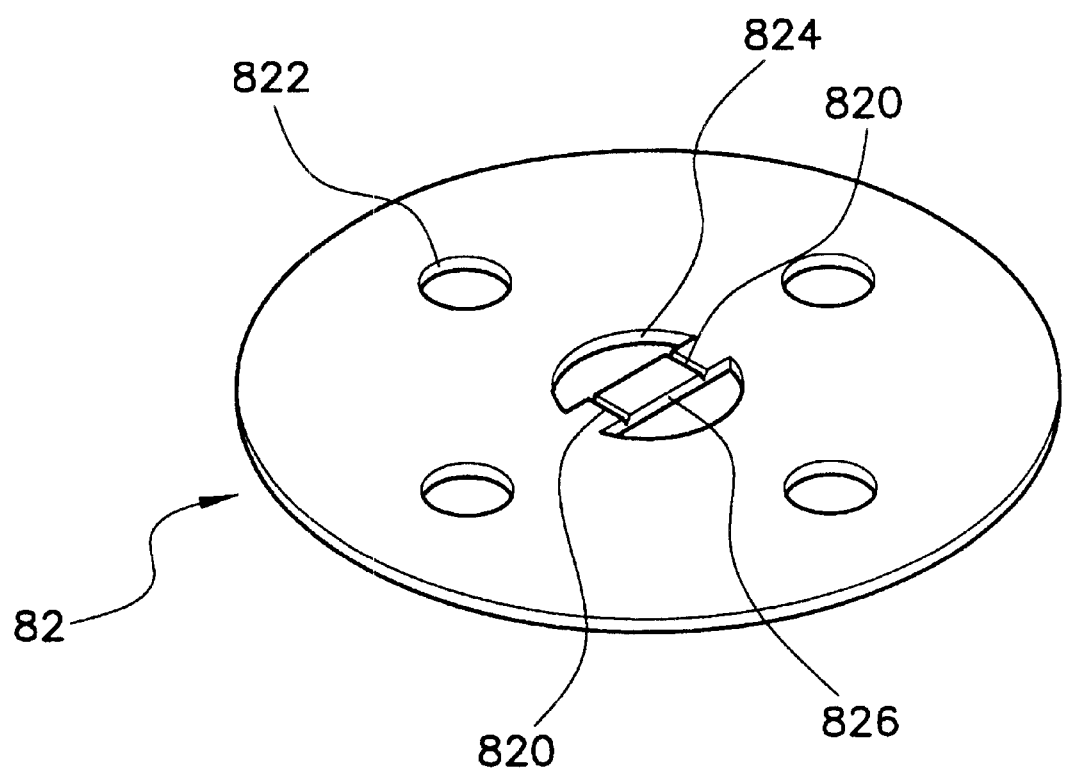
FIG. 2 is a bottom and side perspective view of the circuit breaker depicted in FIG. 1.

Describing more in detail with reference to FIG. 2, the circuit breaker 82 is provided with a plurality of openings 822 through which internal pressure of the battery is directed to the plate 14 having the safety groove 141 and a centrally disposed circular opening 824. A bridge 826 is formed across the opening 824, and the mechanically weak portion includes two notches 820 respectively formed at both ends of the bridge 826. A portion of the bridge 826 between the notches 820 is firmly welded to an under surface of the plate 14, defining an attaching portion. Therefore, a detachment force of the circuit breaker 82 from the plate 14 can be determined by adjusting a depth of the notches 820.

Figure 3:
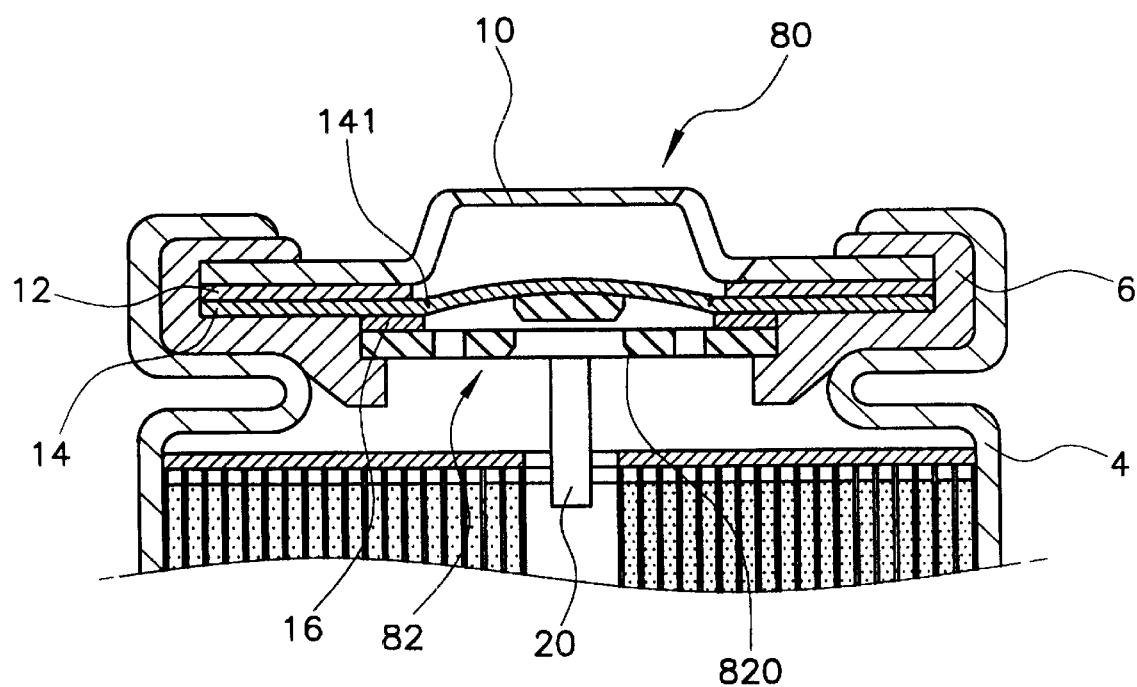
FIG. 3 is a partial sectional view illustrating the operation of the circuit breaker depicted in FIG. 1.

Referring to FIG. 3, when the secondary battery is charged and discharged, gas is generated to form internal pressure. The internal pressure acts on the under surface of the plate 14 through the openings 822 formed on the circuit breaker 82.

As the internal pressure is excessively increased above an allowable level as a result of a malfunction or overcharge of the battery, the circuit breaker 82 is detached from the plate 14 by the internal pressure acting on the plate 14. At this point, since the circuit breaker 82 is firmly welded at its attaching portion to the plate 14, the notches 820 defining the mechanically weak portion are broken rather than the attaching portion being detached from the circuit breaker 82. Therefore, the attaching portion at the notches 820 of the circuit breaker 82 is broken away from the circuit breaker 82 while its attachment to the plate 14 is maintained by the portion of the bridge 826 welded to the plate 14, thereby disconnecting the flow of current in the battery.

Here, it is preferable that the depth of the notches 820 are determined such that the notches 820 can be easily broken by an internal pressure of 7–15 kgf/cm². However, the internal pressure is not limited to the above. That is, the notches 820 can be broken by an internal pressure of 5 kgf/cm² according to a battery used.

Figure 4:
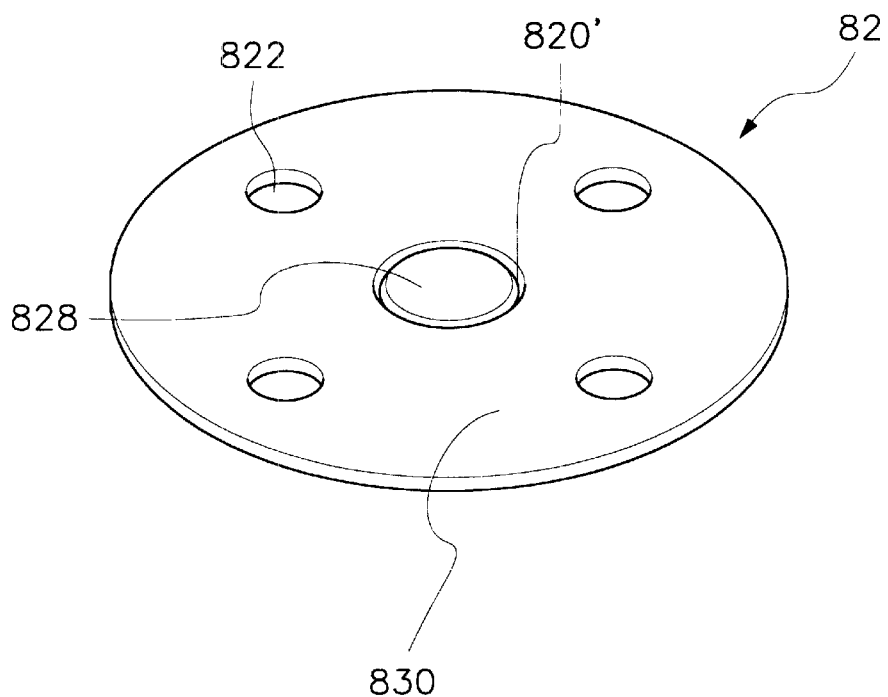
FIG. 4 is a perspective view illustrating a circuit breaker according to a second embodiment of the present invention.

FIG. 4 shows a circuit breaker 82 according to a second embodiment of the present invention.

According to a second embodiment of the present invention, a circular notch 820' is formed around an attaching portion 828 of the circuit breaker 82 such that the attaching portion 828 can break away from the remainder 830 of the circuit breaker 82 at the notch 820'. Since the centrally disposed circular opening 824 disclosed in the first embodiment is not provided, the area attached on the page 14 is increased. As a result, the attaching portion 828 attached to plate 14 is detached at notch 820' from the remainder 830 of the circuit breaker 82 at a higher pressure than in the first embodiment.

Preferably, the circuit breaker 82 that is to break current at a lower pressure would have a deeper notch.

Figure 5:
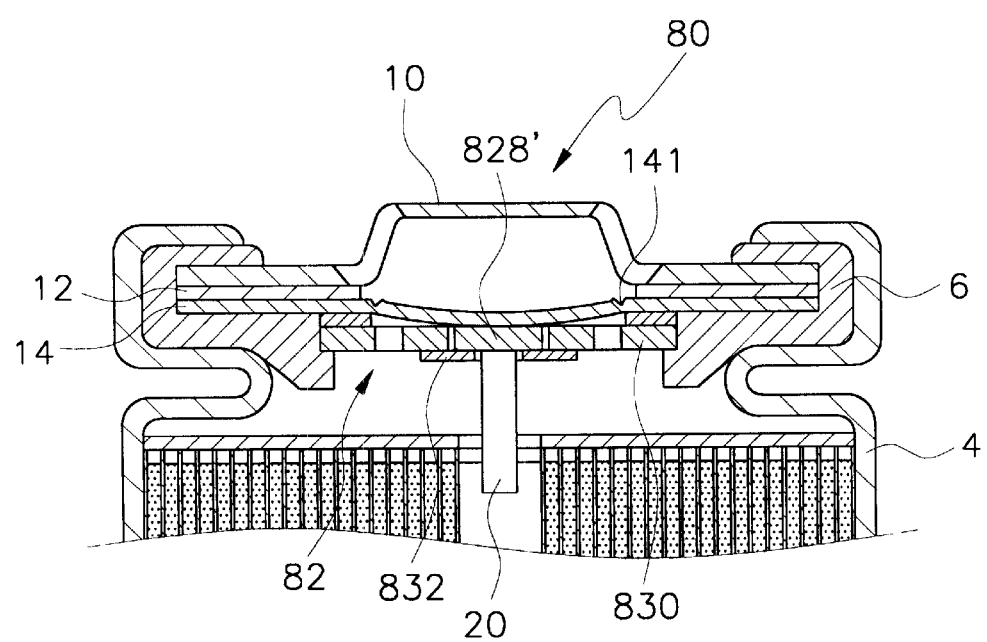
FIG. 5 is a partial sectional view illustrating a secondary battery where a circuit breaker according to a third embodiment of the present invention is employed.
Figure 6:
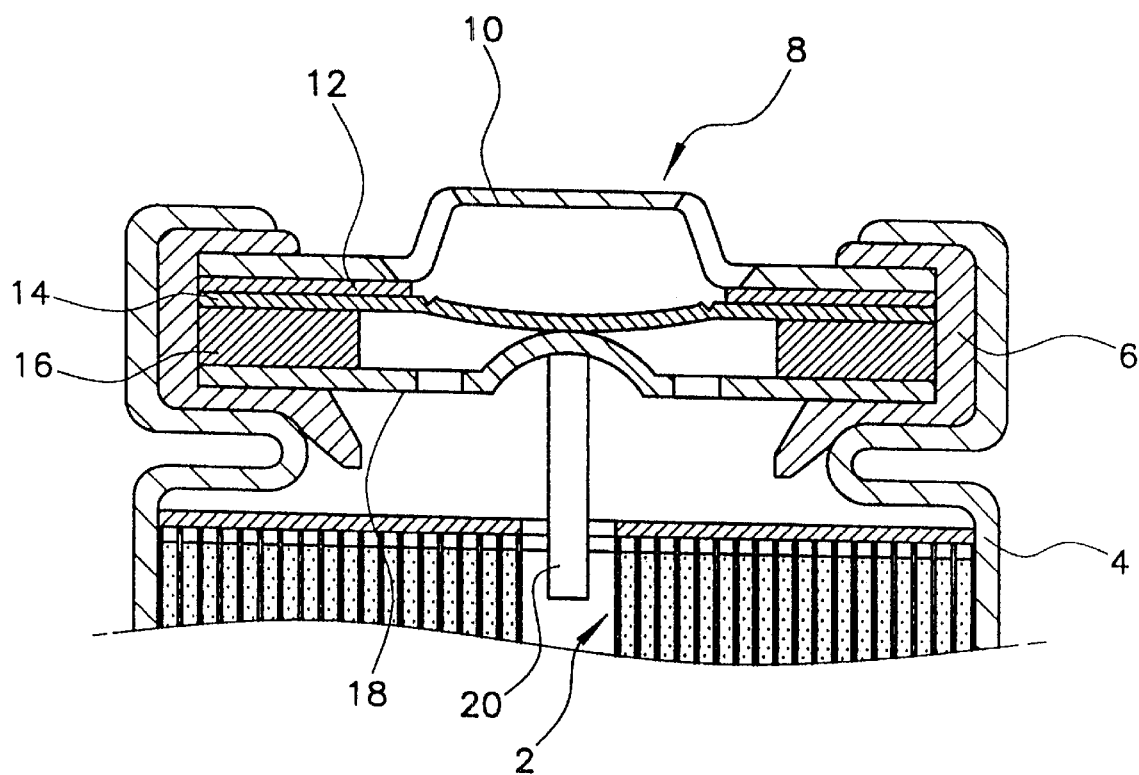
FIG. 6 is a partial sectional view illustrating a secondary battery where a conventional circuit breaker is employed.

FIG. 5 shows a circuit breaker 82 according to a third embodiment of the present invention.

According to a third embodiment of the present invention, an attaching portion 828' of the circuit breaker 82 that would break away from the remaining portion 830 of circuit breaker 82 is not integral with the remaining portion 830 of the circuit breaker 82, the remaining portion 830 looking like a flat ring/washer, but joined to it by a thin film 832 bridging the gap between the attaching portion 828' and the flat ring portion 830. Accordingly, the detachment force can be defined and adjusted according to a thickness of the thin film 832.

Here a film 832 material that would tear under a desired pressure should be used. The thin film 832 may be attached either to the top or bottom surface of the circuit breaker 82.

In the above embodiments, as in the first embodiment, the attaching portion 828 and 828' is welded to the bottom surface of the safety plate 14 more strongly than the attaching portion is coupled to the flat-ring portion.

As described above, since the detachment force of the circuit breaker 82 is determined by the structure of the mechanically weak portion of the circuit breaker 82 rather than the welding force between the circuit breaker 82 and the plate 14, the detachment force can be easily set, improving the safety and reliability of the battery.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A circuit breaker for a secondary battery comprising a can and a cap assembly mounted on the can, the cap assembly comprising a plate and a circuit breaker disposed under the plate, the circuit breaker comprising:

a first portion for attaching to the plate;

a second portion formed around the first portion;

a third portion connecting the first portion to the second portion, the third portion being broken by a predetermined level of pressure; and a centrally formed opening, a bridge formed across the centrally formed opening and notches respectively formed on both ends of the bridge, with the first portion comprising a portion of the bridge, the third portion comprising the notches, and the second portion comprising a remaining portion of the circuit breaker, the remaining portion being a portion of the circuit breaker other than the first portion and the third portion.

2. A cap assembly, comprising:

a plate; and a circuit breaker disposed under the plate, with the circuit breaker comprising an attaching portion firmly attached to the plate and a mechanically weak portion formed around the attaching portion, and with the circuit breaker comprising a centrally formed opening and a bridge formed across the centrally formed opening, and with the mechanically weak portion comprising notches respectively formed on both ends of the bridge and the attaching portion comprising a portion of the bridge.

* * * * *